UNITED STATES PATENT OFFICE.

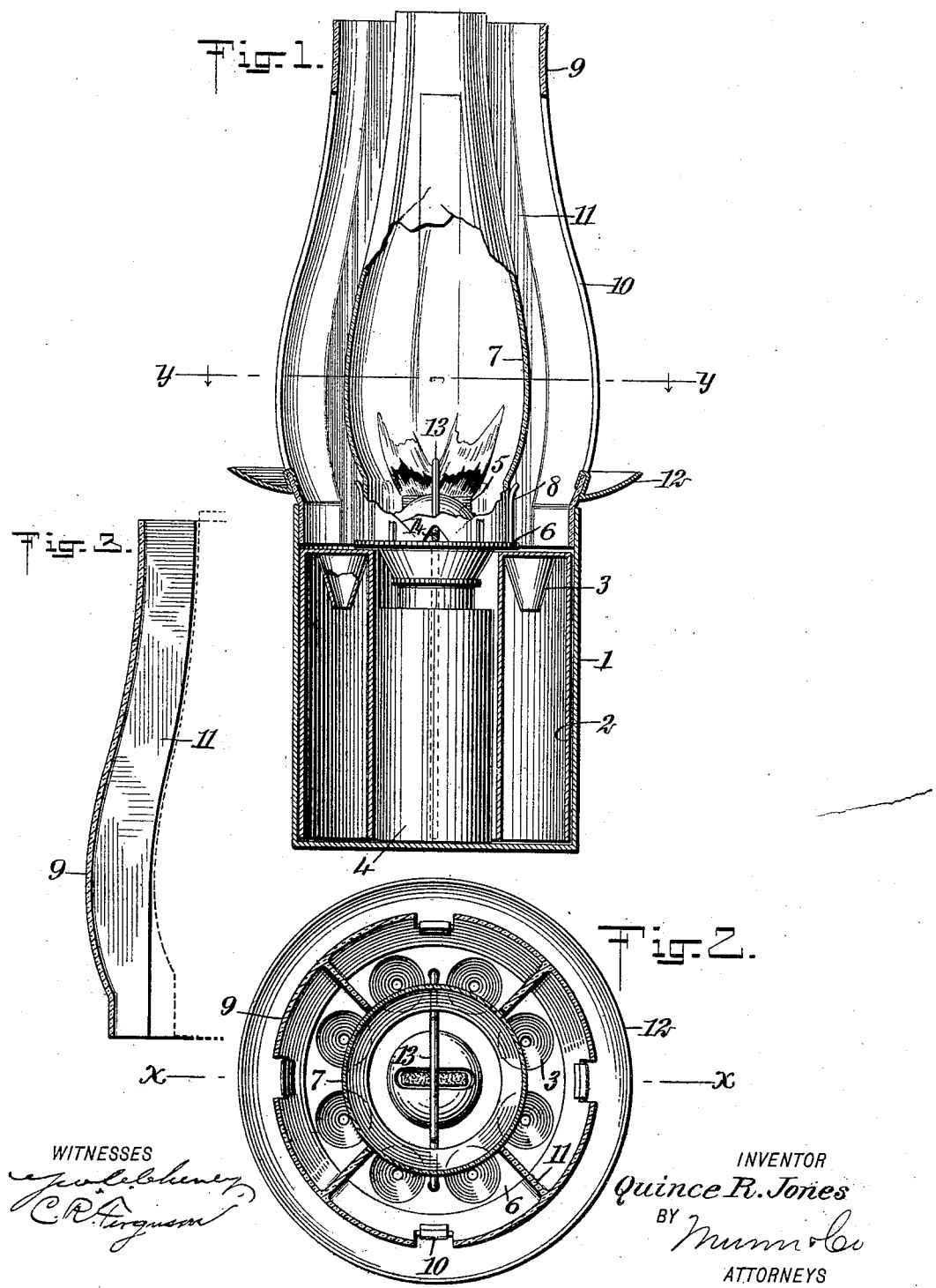

QUINCE ROWLAND JONES, OF YOSEMITE, KENTUCKY.

INSECT-TRAP.

No. 841,531.  Specification of Letters Patent.  Patented Jan. 15, 1907.

Application filed October 26, 1906. Serial No. 340,732.

*To all whom it may concern:*

Be it known that I, QUINCE ROWLAND JONES, a citizen of the United States, and a resident of Yosemite, in the county of Casey and State of Kentucky, have invented a new and Improved Insect-Trap, of which the following is a full, clear, and exact description.

This invention relates to improvements in devices adapted to attract and destroy insects—such as mosquitos, moths, and the like—the object being to provide a device of this character which will be simple in construction, inexpensive, and convenient for use in sleeping-rooms or the like.

I will describe an insect-trap embodying my invention and then point out the novel features in the appended claims.

Reference is to be had to the acompanying drawings, forming a part of this specification, in which similar characters of reference indicate corresponding parts in all the views.

Figure 1 is a sectional elevation of the insect-trap on the line $x\ x$ of Fig. 2. Fig. 2 is a section on the line $y\ y$ of Fig. 1, and Fig. 3 is a sectional detail showing the construction of partition-plates employed.

Referring to the drawings, 1 designates the cup-shaped base, of any suitable material, removably arranged, in which is an annular receptacle 2 for receiving the insects that pass through conical tubes 3, arranged in the upper wall of the receptacle. The lower end of the receptacle is open, so that when removed the insects will drop into the body portion 1, from which of course they may be dumped out. Removably placed within the annular receptacle 2 is a lamp-font 4, provided with the usual burner 5, and on this burner 5 is a flange 6, which may rest upon the upper end of the receptacle 2. The lamp is provided with an ordinary chimney 7, which engages removably in the gallery 8. Attachably connected to the body portion 1 and surrounding the chimney 7 is a globe 9, consisting of glass or other transparent material, so that the light therethrough will attract the insects. This globe at suitable intervals is provided with longitudinally-disposed openings or slots 10, and between the slots there are inwardly-extended partitions 11, thus dividing the interior of the globe into a plurality of chambers. It will be noted in Fig. 2 that the inner edges of the partitions 11 for a portion of their length conform to the shape of the chimney 7; but at the lower portion the lines are practically straight, so that the globe may be readily passed over the chimney. Arranged around the lower portion of the globe is a trough-shaped flange 12, which, as here shown, is held in position by lugs formed integral with the inner edge of the flange and bent over the lower walls of the openings 10, thus forming hooks.

In the operation as so far described insects passing through the openings 10 will either be killed instantly by the heat between the chimney and globe or by flying against the highly-heated partitions 11. The insects thus destroyed will fall down through the tubes 3 into the receptacle 2. Should, however, any live insects pass into the receptacle, I provide means for heating the interior of the receptacle sufficiently to destroy such live insects. This means consists of a wire 13, which is carried by the lamp-burner and has a curved portion to pass through the flange, as clearly indicated in Fig. 1. This wire has outwardly-turned portions to rest upon the flange 6, and this flange is provided with perforations through which leg members of the wire extend downward into the receptacle. Of course this wire will become highly heated, and consequently heat the interior of the chamber, for the purpose before described. To receive the outwardly-disposed portions of the wire at the top of the flange 6, the lower end of the chimney may be notched, as indicated at 14. Should insects light upon the outer portions of the globe between the openings 10, they would fall into the trough 12.

It will be seen that the device embodying my invention is very simple in its construction, and as the several parts may be separated readily it may easily be cleaned.

Having thus described my invention, I claim as new and desire to secure by Letters Patent—

1. An insect-trap comprising a cup-shaped body portion, an annular receptacle removably arranged in the body portion and having openings in its top through which insects may fall, a lamp-font removably arranged within the circle of the annular chamber, a chimney for the lamp, and a globe surrounding the chimney and having openings in its wall.

2. An insect-trap comprising a cup-shaped body portion, an annular receptacle removably arranged therein and having openings in its top, conical tubes extended downward from said openings, a lamp-font adapted to be arranged within the inner circle of the receptacle, a burner for the lamp extended above the plane of the receptacle, a chimney for the lamp, a globe surrounding the chimney and having longitudinal slots, and inwardly-extended partitions on the inner side of said globe adapted to engage a portion of their inner edges with the chimney.

3. An insect-trap comprising a cup-shaped body portion, a removable receptacle having openings in its top, the said receptacle being adapted to be placed in the body portion, a lamp having its burner arranged above the receptacle, a chimney for the burner, a globe surrounding the chimney and longitudinally slotted, and a trough-shaped flange extending around the lower portion of the globe.

4. An insect-trap comprising a cup-shaped body portion, an insect-receptacle removably arranged therein, a lamp body or font removably arranged in the receptacle and having its burner extended above the receptacle, a chimney for the lamp, the upper wall of said receptacle having a plurality of openings, conical tubes leading downward from the openings into the receptacle, a globe surrounding the chimney, the said globe being longitudinally slotted, inwardly-extended partitions arranged at intervals at the inner side of the globe and conforming, for a portion of their length, with the chimney, and a trough-shaped flange extending around the lower portion of the globe.

5. An insect-trap comprising a cup-shaped body portion, an annular insect-receptacle arranged therein and having openings in its top wall, the said receptacle being open at the bottom, a lamp-font adapted to be arranged within the receptacle and having its burner extended above the receptacle, a heating-wire carried by the burner and having a portion adapted to extend through the lamp-flame and portions for extending into the receptacle, a chimney for the lamp, and a longitudinally-slotted globe surrounding the chimney.

In testimony whereof I have signed my name to this specification in the presence of two subscribing witnesses.

QUINCE ROWLAND JONES.

Witnesses:
THOMAS BRONSON,
E. E. KELSAY.